US00RE41598E

(19) United States
(12) Reissued Patent
Chang et al.

(10) Patent Number: US RE41,598 E
(45) Date of Reissued Patent: Aug. 31, 2010

(54) IMPEDANCE MATCHING CIRCUIT

(75) Inventors: Horng-Der Chang, Hua-Lien (TW); Chao-Cheng Lee, Hsin-Chu (TW)

(73) Assignee: Realtek Semiconductor Corp., Hsinchu (TW)

(21) Appl. No.: 11/108,886

(22) Filed: Apr. 19, 2005

Related U.S. Patent Documents

Reissue of:
(64) Patent No.: 6,552,565
Issued: Apr. 22, 2003
Appl. No.: 10/095,590
Filed: Mar. 11, 2002

(30) Foreign Application Priority Data

May 13, 2001 (TW) ..... 90203702

(51) Int. Cl.
*H03K 19/003* (2006.01)

(52) U.S. Cl. ..... 326/30; 326/83
(58) Field of Classification Search ..... 326/26, 326/27, 30, 83, 86
See application file for complete search history.

(56) References Cited

U.S. PATENT DOCUMENTS 5,111,080 A 5/1992 Mizukami et al.
5,235,222 A 8/1993 Kondoh et al.
5,361,038 A 11/1994 Allen
5,361,042 A 11/1994 Gist
5,365,197 A 11/1994 Ikalainen
5,726,582 A 3/1998 Hedberg
6,288,564 B1 9/2001 Hedberg
6,307,791 B1 10/2001 Otsuka et al.
6,414,525 B2 7/2002 Urakawa
6,424,169 B1 * 7/2002 Partow et al. ..... 326/30

FOREIGN PATENT DOCUMENTS

EP 0554121 8/1993
EP 0573807 12/1993
WO WO 9524089 A 9/1995

* cited by examiner

*Primary Examiner*—Don P Le
(74) *Attorney, Agent, or Firm*—Thomas, Kayden, Horstemeyer & Risley

(57) ABSTRACT

The present invention discloses an impedance matching circuit for facilitating impedance matching between the characteristic impedance of a cable and the input impedance at the input terminal of a receiver for data transmission comprising: a first transistor, a second transistor, a resistor, a negative feedback control circuit, a multiplexer and a reference voltage generator. When the characteristic impedance of the cable varies, the equivalent resistance of the impedance matching circuit can be kept equal to the resistance of the varied characteristic impedance of the cable by adjusting the reference voltage.

26 Claims, 5 Drawing Sheets

IMPEDANCE MATCHING CIRCUIT

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention generally relates to an impedance matching circuit for facilitating impedance matching between the characteristic impedance of a cable and the input impedance at the input terminal of a receiver for data transmission and, more particularly, to an impedance matching circuit with adjustable resistance for facilitating impedance matching between the characteristic impedance of the cable and the input impedance at the input terminal of a receiver for data transmission even when the characteristic impedance of the cable varies.

2. Description of the Prior Art

FIG. 1 is a schematic diagram showing a data transmission system. In FIG. 1, the data transmission system comprises two portions: a transceiver $T_X$ 10 and a receiver $R_X$ 12, where a cable 14 is interposed between the transceiver $T_X$ 10 and the receiver $R_X$ 12 for communication. In general, a cable has a characteristic impedance $Z_\Phi$. If the input impedance $Z_{in}$, at the input terminal of the receiver $R_X$ 12 does not match the characteristic impedance $Z_{101}$ of the cable 14, signal reflection may occur which may distort signals. Therefore, the input impedance $Z_{in}$ of the receiver $R_X$ 12 must be properly adjusted to match the characteristic impedance $Z_{101}$ of the cable 14, so as to reduce signal reflection and prevent signals from distortion.

FIG. 2A to FIG. 2D are schematic diagrams showing various conventional impedance matching circuits in accordance with the prior art. In FIG. 2A, $Z_{101}$ denotes the characteristic impedance of a cable 202, $Z_{in}$ denotes the input impedance 206 viewed at the input terminal of the receiver $R_X$ 208, and $R_{101}$ denotes a stable resistor 204 interposed between the input terminal of the receiver $R_X$ 208 and a voltage source $V_{dd}$. Generally, the input impedance $Z_{in}$ 206 at the input terminal of the receiver $R_X$ 208 is relatively large. More particularly, the resistance of the input impedance $Z_{in}$ 206 is much larger than that of the stable resistor $R_{101}$ 204. Hence, the parallel connection of the stable resistor $R_{101}$ 204 and the input impedance $Z_{in}$ 206 results in a resistance value approximately equal to that of the stable resistor $R_{101}$ 204. When the resistance of the stable resistor $R_{101}$ 204 is determined to be equal to that of the characteristic impedance $Z_{101}$ of the cable 202, impedance matching can be achieved.

In FIG. 2B, $Z_{101}$ denotes the characteristic impedance of the cable 212, $Z_{in}$ denotes the input impedance 216 viewed at the input terminal of the receiver $R_X$ 218, and $R_{101}$ denotes the stable resistor 214 interposed between the input terminal of the receiver $R_X$ 218 and the ground. Generally, the input impedance $Z_{in}$ 216 at the input terminal of the receiver $R_X$ 218 is relatively large. More particularly, the resistance of the input impedance $Z_{in}$ 216 is much larger than that of the stable resistor $R_{101}$ 214. Hence, the parallel connection of the stable resistor $R_{101}$ 214 and the input impedance $Z_{in}$ 216 results in a resistance value approximately equal to that of the stable resistor $R_{101}$ 214. When the resistance of the stable resistor $R_{101}$ 204 is determined to be equal to that of the characteristic impedance $Z_{101}$ of the cable 212, impedance matching can be achieved.

In FIG. 2C, $Z_{101}$ denotes the characteristic impedance of a cable 222, and $Z_{in}$ denotes the input impedance 226 viewed at the input terminal of the receiver $R_X$ 228. The input terminal of the receiver $R_X$ 228 is connected to the drain of a p-channel MOSFET (abbreviated as "PMOS" hereinafter) 224. The source of the PMOS 224 is connected to a voltage source $V_{dd}$, while the gate of the PMOS 224 is connected to the control terminal of a feedback control circuit 225. A precise resistor $R_{ext}$ 227 is interposed between the signal terminal of the feedback control circuit 225 and the voltage source $V_{dd}$. $R_{eff}$ denotes the equivalent resistance viewed at the drain of the PMOS 224, therefore the resistance of the precise resistor $R_{ext}$ 227 is expressed as $R_{ext}=\alpha\cdot R_{eff}$, where the value of $\alpha$ is controlled by the feedback control circuit 225. Generally, the input impedance $Z_{in}$ 226 at the input terminal of the receiver $R_X$ 228 is relatively large. More particularly, the resistance of the input impedance $Z_{in}$ 226 is much larger than the equivalent resistance $R_{eff}$ viewed at the drain of the PMOS 224. Hence, the parallel connection of the equivalent resistance $R_{eff}$ and the input impedance $Z_{in}$ 226 results in a resistance value approximately equal to the equivalent resistance $R_{eff}$. When the equivalent resistance $R_{eff}$ is determined to be equal to that of the characteristic impedance $Z_{101}$ of the cable 222, impedance matching can be achieved.

In FIG. 2D, $Z_{101}$ denotes the characteristic impedance of a cable 232, and $Z_{in}$ denotes the input impedance 236 viewed at the input terminal of the receiver $R_X$ 238. The input terminal of the receiver $R_X$ 238 is connected to the drain of an n-channel MOSFET (abbreviated as "NMOS" hereinafter) 234. The source of the NMOS 234 is connected to the ground, while the gate of the NMOS 234 is connected to the control terminal of a feedback control circuit 235. A precise resistor $R_{ext}$ 237 is interposed between the signal terminal of the feedback control circuit 235 and the ground. $R_{eff}$ denotes the equivalent resistance viewed at the drain of the NMOS 234, therefore the resistance of the precise resistor $R_{ext}$ 237 is expressed as $R_{ext}=\beta\cdot R_{eff}$ where the value of $\beta$ is controlled by the feedback control circuit 235. Generally, the input impedance $Z_{in}$ 236 at the input terminal of the receiver $R_X$ 238 is relatively large. More particularly, the resistance of the input impedance $Z_{in}$ 236 is much larger than the equivalent resistance $R_{eff}$ viewed at the drain of the NMOS 234. Hence, the parallel connection of the equivalent resistance $R_{eff}$ and the input impedance $Z_{in}$ 236 results in a resistance value approximately equal to the equivalent resistance $R_{eff}$. When the equivalent resistance $R_{eff}$ is determined to be equal to that of the characteristic impedance $Z_{101}$ of the cable 232, impedance matching can be achieved.

From FIG. 2A to FIG. 2D, the stable resistor $R_{101}$ and the precise resistor $R_{ext}$ have to change as the characteristic impedance $Z_{101}$ of the cable varies. When there are a considerable number of cables, the number of the stable resistors increases as the number of cables increases, resulting in increased fabrication cost and complexity of the impedance matching circuit.

FIG. 3 is a schematic diagram showing another conventional impedance matching circuit in the prior art. In FIG. 3, $R_{cur}$ denotes a built-in/external bias resistor 302 for providing the transistor mib 304 with the current $I_{bias}$. A current mirror circuit is composed of the transistor mdrz 306, the transistor mb7 308, the transistor mdlz 310, the transistor mdri 312, the transistor ma7 314, the transistor mdli 316 and the transistor mib 304. Since all the gates of the above transistors are connected together, the current in the current mirror is proportional to the bias current $I_{bias}$ according to the W/L ratio of the transistors.

The gate voltage $V_{ref}$ of both the transistor muri 318 and the transistor mulz 320 is a reference voltage, the potential level of which is ΔV lower than that of the voltage source $V_{dd}$. The transistor muli 322, the transistor muri 318, the transistor mulz 320 and the transistor murz 324 are used for level-shifting, that is, making the gate voltage $V_{ref}$ of the transistors decrease to a voltage value approximately equal to the threshold voltage and then outputting an output voltage (i.e., as a source follower).

An operational amplifier with an output voltage $V_{oa}$ is composed of the transistor mal 326, the transistor ma2 328, the transistor ma3 330, the transistor ma4 332, and the transistor ma5 334. The gate voltage $V_{ref}$ is level-shifted by the transistor muri 318 and then applied to the gate of the transistor ma2 328 through the node ka2. For the output voltage $V_{oa}$, a negative feedback circuit (where the capacitor mca 340 serves as a frequency compensation capacitor for stabilizing the operational amplifier) is formed of the transistor mna2 336, the transistor mna1 338, the gate voltage $V_{ref}$, and the node ka1. Hence, the voltage at the node ka1 is equal to that at the node ka2, where the former is a voltage obtained by level shifting the voltage $V_{ext}$ and the latter is a voltage obtained by level shifting the voltage $V_{ref}$ Therefore, the voltage $V_{ext}$ is equal to voltage $V_{ref}$.

Another operational amplifier with an output voltage $V_{ob}$ is composed of the transistor mb1 342, the transistor mb2 344, the transistor mb3 346, the transistor mb4 348, and the transistor mb5 350. The gate voltage $V_{ref}$ is level-shifted by the transistor mulz 320 and then applied to the gate of the transistor mb2 344 through the node kb2. For the output voltage $V_{ob}$, a negative feedback circuit (where the capacitor mcb 354 serves as a frequency compensation capacitor for stabilizing the operational amplifier) is formed of the transistor mz0 352, the voltage $V_{xx}$, the transistor murz 324, and the node kb1. Hence, the voltage at the node kb1 is equal to that at the node kb2, where the former is a voltage obtained by level shifting the voltage $V_{xx}$ and the latter is a voltage obtained by level shifting the voltage $V_{ref}$. Therefore, the voltage $V_{xx}$ is equal to voltage $V_{ref}$.

The gate of the transistor mna2 336 is connected to the gate of the transistor mnb2 356. Therefore, the current flowing through the transistor mna2 336 is equal to the current flowing through the transistor mnb2 356, and the current flowing through the resistor $R_{ext}$ 358 is equal to the current flowing through the transistor mz0 352, which means that the resistance value of the resistor $R_{ext}$ 358 is equal to the equivalent resistance of the transistor mz0 352.

The circuit as shown in FIG. 3 is characterized in that $V_{ext}=V_{ref}=V_{xx}$ and that the current flowing through the resistor $R_{ext}$ 358 is equal to the current flowing through the transistor mz0 352. Therefore, the equivalent resistance of the transistor mz0 352 can be regarded equal to the resistance value of the resistor $R_{ext}$ 358, even though it takes two operational amplifiers to meet the above conditions.

Let us assume that the width of the transistor mz0 352 is equal to $W_p$, the width of the transistor mlp1 360 is equal to $10W_p$, the width of the transistor mlp2 362 is equal to $W_p$, the width of the transistor mnb2 356 is equal to $W_s$, the width of the transistor mnx 364 is equal to $11W_s$ and the gate of the transistor mnb2 356 is connected to the gate of the transistor mnx 364. As a result, the current flowing through the transistor mnx 364 is 11 times the current flowing through the transistor mnb2 356, and the current flowing through the transistor mlp1 360 is 10 times the current flowing through the transistor mz0 352. In addition, the current flowing through the transistor mlp2 362 is equal to the current flowing through the transistor mz0 352 (because the gate of the transistor mlp1 360, the gate of the transistor mlp2 362 and the gate of the transistor mz0 352 are connected). Therefore, the equivalent resistance viewed at the node datab towards the voltage source $V_{dd}$ is one tenth of the equivalent resistance of the transistor mz0 352 and the equivalent resistance viewed towards the ground approaches infinity. Accordingly, the equivalent resistance at the node datab is equal to $(1/10)*R_{ext}//\text{infinity}=(1/10)*R_{ext}$. (wherein the term "//" means parallel)

However, there are still some problems related to the prior art impedance matching circuit in that: (1) the resistance for impedance matching of the impedance matching circuit as well as the resistor $R_{ext}$ should change when the characteristic impedance of the cable varies; (2) two operational amplifiers are required to complete a negative feedback circuit so that the fabrication cost as well as the complexity may increase; and (3) the resistance value for impedance matching of the impedance matching circuit can not be changed by simply changing the voltage $V_{ref}$ of the impedance matching circuit.

SUMMARY OF THE INVENTION

Accordingly, it is the primary object of the present invention to provide an impedance matching circuit with adjustable resistance for facilitating impedance matching between the characteristic impedance of a cable and the input impedance at the input terminal of a receiver for data transmission even when the characteristic impedance of the cable varies.

In order to achieve the foregoing objects, the present invention provides an impedance matching circuit with adjustable resistance for facilitating impedance matching between the characteristic impedance of a cable and the input impedance at the input terminal of a receiver for data transmission. The impedance matching circuit comprises: a first transistor, a second transistor, a resistor and a negative feedback control circuit. The first transistor includes a power supply terminal, a control terminal and a load terminal, wherein the power supply terminal of the first transistor is connected to a voltage supply, and the load terminal of the first transistor is connected to an input terminal of the receiver. The second transistor includes a power supply terminal, a control terminal and a load terminal, wherein the power supply terminal of the second transistor is connected to a voltage supply, and the control terminal of the second transistor is connected to the control terminal of the first transistor. One terminal of the resistor is connected to the load terminal of the second transistor, while the other terminal is connected to the ground. An inverting input terminal of the negative feedback control circuit receives an adjustable reference voltage, a non-inverting input terminal of the negative feedback control circuit is connected to the load terminal of the second transistor, and an output terminal of the negative feedback control circuit is connected to the control terminal of the second transistor. When the characteristic impedance of the cable varies, the equivalent resistance of the impedance matching circuit can be kept equal to the resistance of the varied characteristic impedance of the cable by adjusting the reference voltage.

It is preferable that the negative feedback control circuit can be implemented by using one of an operational amplifier, a differential amplifier, and an inverter amplifier.

It is preferable that the impedance matching circuit further comprises: a multiplexer. The multiplexer includes a select terminal and a signal output terminal, wherein the multiplexer receives a plurality of voltage signals having different magnitudes, selects one from the plurality of voltage signals according to a select signal received by the select terminal, and then outputs the voltage signal as the reference voltage into the inverting input terminal of the negative feedback control circuit.

It is preferable that the negative feedback control circuit further comprises a reference voltage generator for generating the voltage signals to be output to the multiplexer.

It is preferable that the first transistor is a p-channel MOSFET and the second transistor is a p-channel MOSFET.

In order to achieve the foregoing objects, the present invention provides an impedance matching circuit with adjustable resistance for facilitating impedance matching between the characteristic impedance of a cable and the input impedance at the input terminal of a receiver for data transmission. The impedance matching circuit comprises: a first transistor, a second transistor, a resistor and a negative feedback control circuit. The first transistor includes a power supply terminal, a control terminal and a load terminal, wherein the power supply terminal of the first transistor is connected to an input terminal of the receiver, and the load terminal of the first transistor is connected to the ground. One terminal of the resistor is connected to a voltage source. The second transistor includes a power supply terminal, a control terminal and a load terminal, wherein the power supply terminal of the second transistor is connected to another terminal of the resistor, the control terminal of the second transistor is connected to the control terminal of the first transistor, and the load terminal of the second transistor is connected to the ground. An inverting input terminal of the negative feedback control circuit receives an adjustable reference voltage, a non-inverting input terminal of the negative feedback control circuit is connected to the power supply terminal of the second transistor, and an output terminal of the negative feedback control circuit is connected to the control terminal of the second transistor. When the characteristic impedance of the cable varies, the equivalent resistance of the impedance matching circuit can be kept equal to the resistance of the varied characteristic impedance of the cable by adjusting the reference voltage.

It is preferable that the negative feedback control circuit can be implemented by using one of an operational amplifier, a differential amplifier, and an inverter amplifier.

It is preferable that the impedance matching circuit further comprises: a multiplexer. The multiplexer includes a select terminal and a signal output terminal, wherein the multiplexer receives a plurality of voltage signals having different magnitudes, selects one from the plurality of voltage signals according to a select signal received by the select terminal, and then outputs the voltage signal as the reference voltage into the inverting input terminal of the negative feedback control circuit.

It is preferable that the negative feedback control circuit further comprises a reference voltage generator for generating the voltage signals to be output to the multiplexer.

It is preferable that the first transistor is an n-channel MOSFET and the second transistor is an n-channel MOSFET.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE INVENTION

The present invention providing an impedance matching circuit can be exemplified by the preferred embodiments as described hereinafter.

Embodiment I

Figure 1:
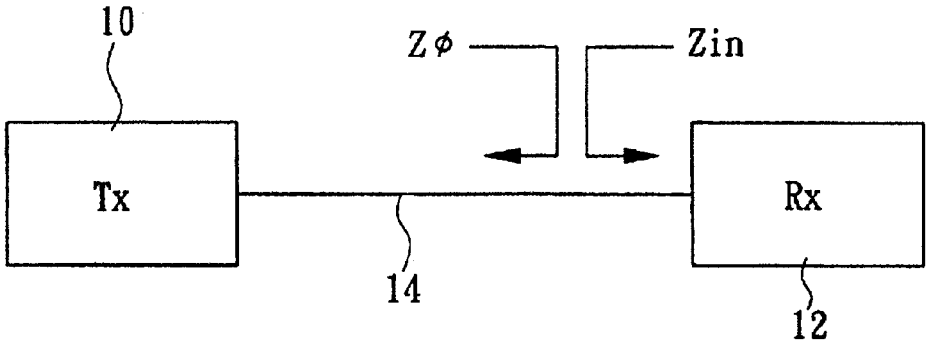
FIG. 1(PRIOR ART)
FIG. 1 is a schematic diagram showing a data transmission system.
Figure 2A:
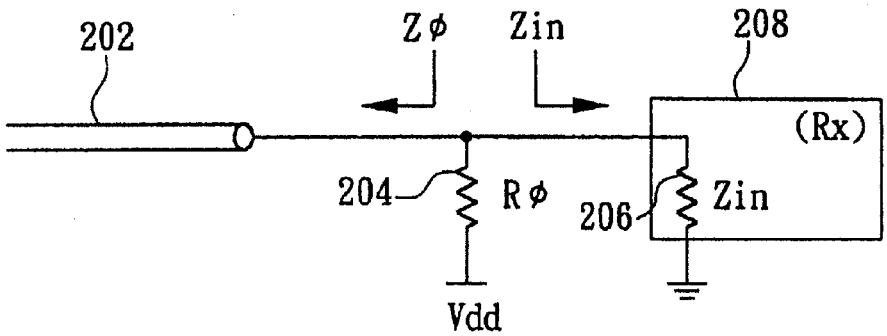
FIG. 2A(PRIOR ART)
FIG. 2A to FIG. 2D are schematic diagrams showing various conventional impedance matching circuits in accordance with the prior art.
Figure 2B:
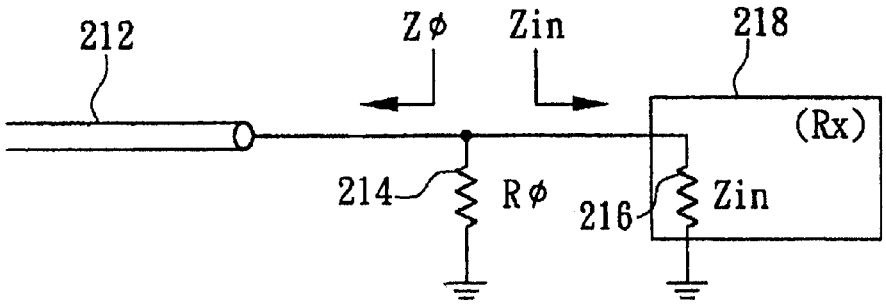
FIG. 2B(PRIOR ART)
Figure 2C:
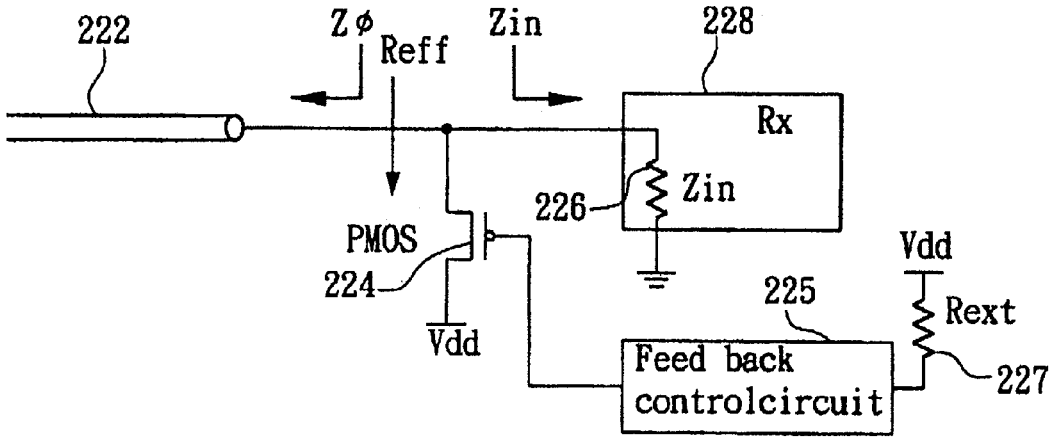
FIG. 2C(PRIOR ART)
Figure 2D:
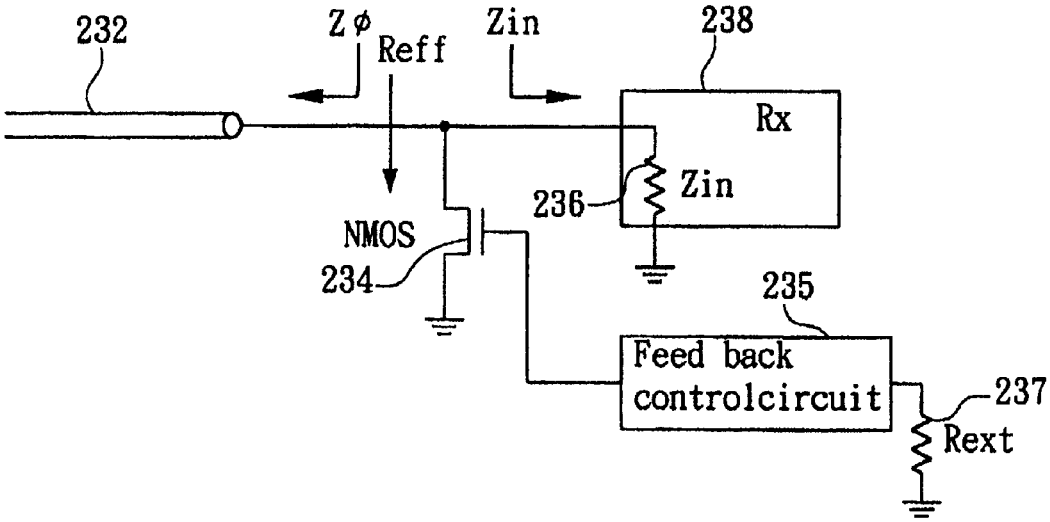
FIG. 2D(PRIOR ART)
Figure 3:
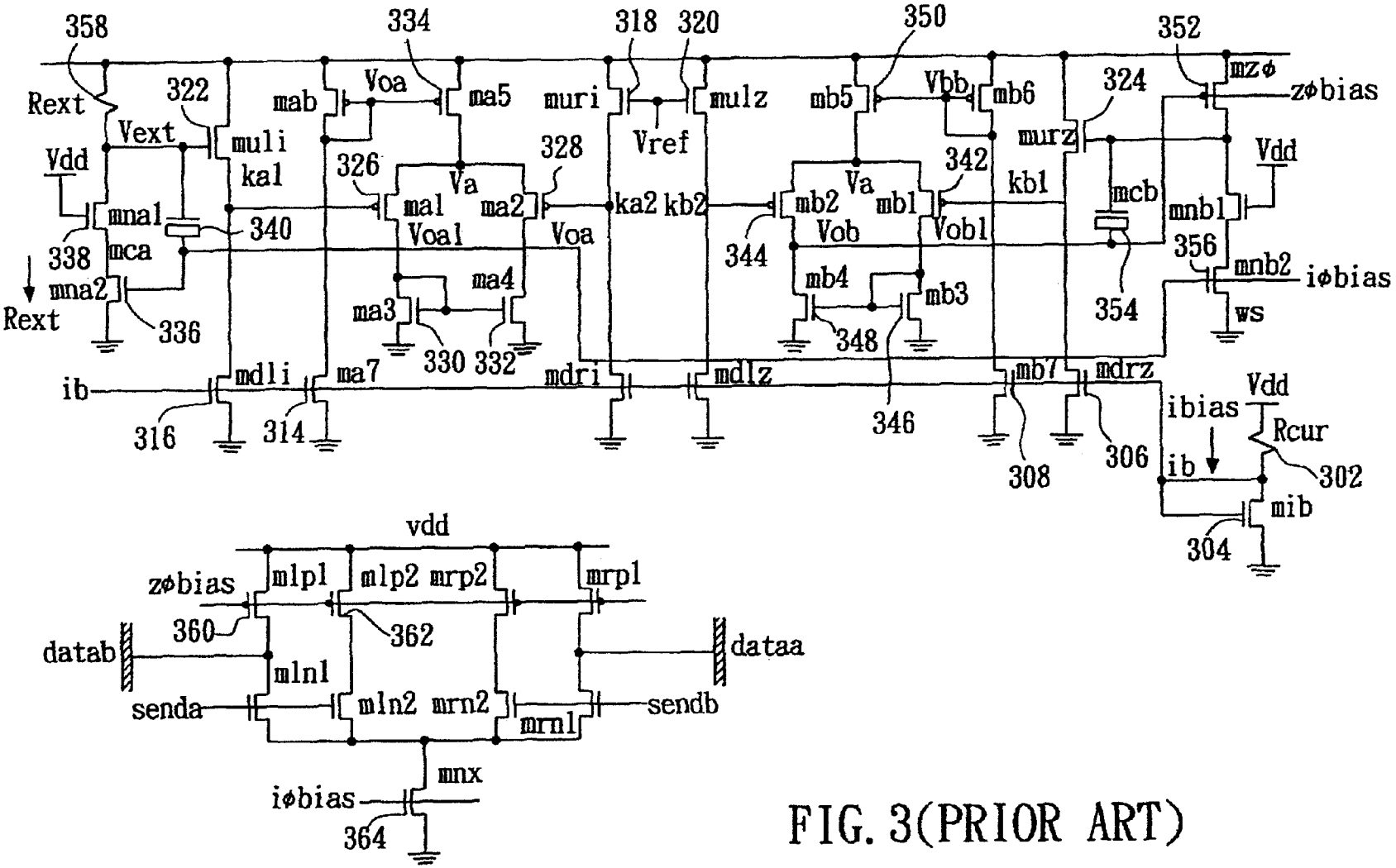
FIG. 3(PRIOR ART)
FIG. 3 is a schematic diagram showing another conventional impedance matching circuit in the prior art.
Figure 4:
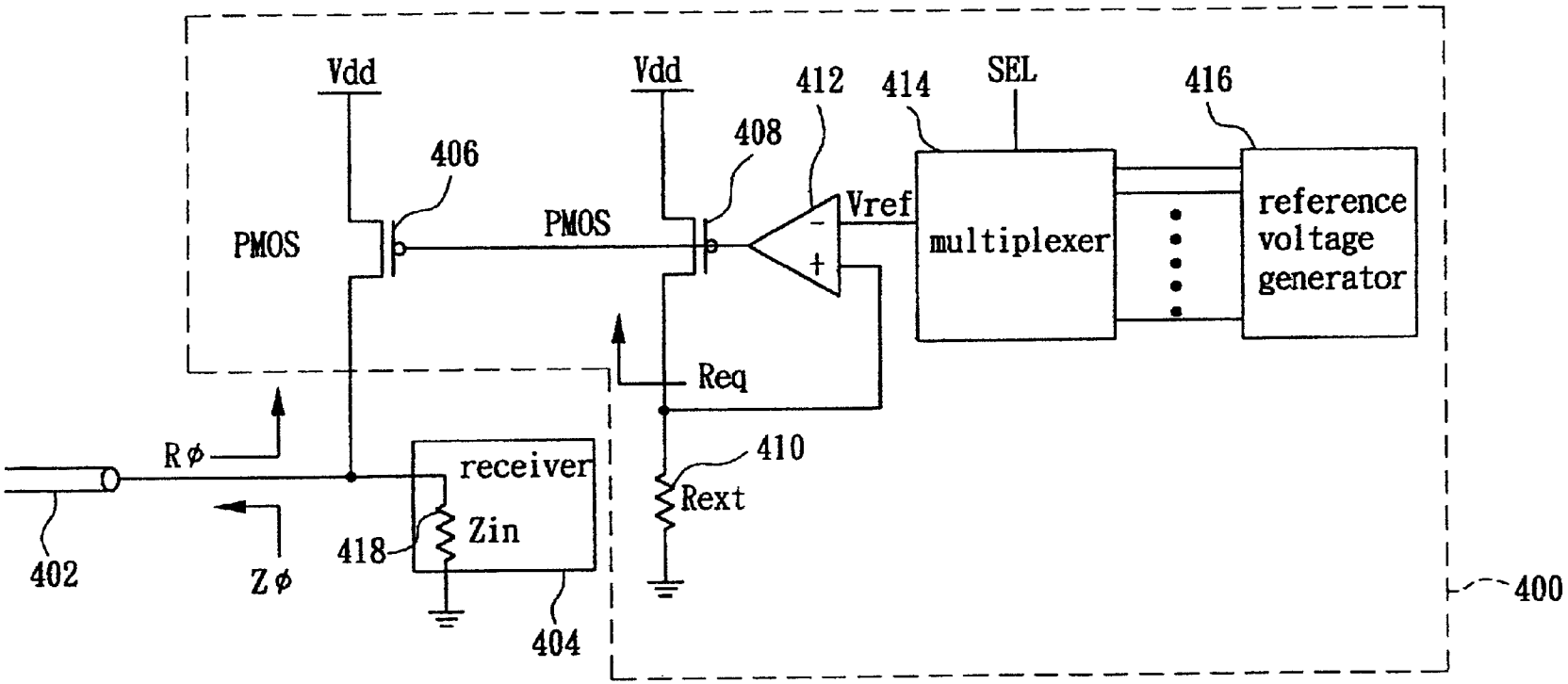
FIG. 4 is a schematic diagram showing an impedance matching circuit in accordance with one embodiment of the present invention.

Please refer to FIG. 4, which is a schematic diagram showing an impedance matching circuit in accordance with one embodiment of the present invention. In FIG. 4, an impedance matching circuit 400 with adjustable resistance is used for facilitating impedance matching between the characteristic impedance of a cable 402 and the input impedance at the input terminal of a receiver 404 for data transmission. The impedance matching circuit 400 is described hereinafter.

The source of the p-channel MOSFET (abbreviated as "PMOS" hereinafter) 406 is connected to the voltage source $V_{dd}$ and the drain of the PMOS 406 is connected to an input terminal of the receiver 404. The source of the PMOS 408 is connected to the voltage source $V_{dd}$ and the gate of the PMOS 408 is connected to the gate of the PMOS 406. One terminal of the resistor $R_{ext}$ 410 is connected to the drain of the PMOS 408 and the other terminal of the resistor $R_{ext}$ 410 is connected to the ground. The inverting input terminal of the operational amplifier 412 receives a reference voltage $V_{ref}$, the non-inverting input terminal of the operational amplifier 412 is connected to the drain of the PMOS 408, and the output terminal of the operational amplifier 412 is connected to the gate of the PMOS 408. The select terminal of the multiplexer 414 receives a select signal SEL, and the signal output terminal outputs the reference voltage $V_{ref}$ to the inverting input terminal of the operational amplifier 412. Moreover, The reference voltage generator 416 includes a plurality of voltage output terminals for outputting the reference voltage $V_{ref}$ to the signal input terminal of the multiplexer 414.

In FIG. 4, the reference voltage at the inverting input terminal of the operational amplifier 412 is expressed as $V_{ref}=\alpha\cdot V_{dd}$, where $0<\alpha\leqq 1$. A negative feedback circuit is formed of the PMOS 406, the PMOS 408, and the resistor $R_{ext}$ 410. According to the virtual short circuit theory, we obtain $V_{ref}=\alpha\cdot V_{dd}=V_{ext}$, where $V_{ext}$ is the voltage across the drain of the PMOS 408 and the resistor $R_{ext}$ 410. Assuming that the equivalent resistance viewed at the drain of the PMOS 408 is $R_{eq}$, we obtain the voltage $$V_{ext} = \frac{R_{ext}}{R_{ext} + R_{eq}} \cdot V_{dd}.$$

That is $$\alpha = \frac{R_{ext}}{R_{ext} + R_{eq}}$$

and the equivalent resistance $$R_{eq} = \frac{1-\alpha}{\alpha} \cdot R_{ext}.$$

Let us assume that the aspect ratio of the PMOS 406 is $$\left(\frac{W}{L}\right)_{P1},$$

the aspect ratio of the PMOS 408 is $$\left(\frac{W}{L}\right)_{P2},$$

and the ratio between $$\left(\frac{W}{L}\right)_{P1}$$

and $$\left(\frac{W}{L}\right)_{P2}$$

is x, then $$\left(\frac{W}{L}\right)_{P1} = x \cdot \left(\frac{W}{L}\right)_{P2}.$$

Let us assume that $R_{101}$ denotes the equivalent resistance viewed at the drain of the PMOS 406, where $$R_{\Phi} = \frac{1}{\mu_P \cdot C_{ox} \cdot \left(\frac{W}{L}\right)_{P1} \cdot (V_{sg1} - |V_{tP}|)}$$

$$R_{eq} = \frac{1}{\mu_P \cdot C_{ox} \cdot \left(\frac{W}{L}\right)_{P2} \cdot (V_{sg2} - |V_{tP}|)}$$

$$V_{sg1} = V_{sg2}$$

$$\Rightarrow R_{\Phi} = \frac{1}{x} \cdot R_{eq}$$

$$\Rightarrow R_{\Phi} = \frac{1}{x} \cdot \frac{1-\alpha}{\alpha} R_{ext}$$

where, $\mu_p$ is the carrier mobility, $C_{ox}$ is the electric capacitance per unit area at the gate, $V_{sg1}$ and $V_{sg2}$ are the voltage drops across the source and the gate, and $|V_{tp}|$ is the threshold voltage.

Therefore, when the input impedance $Z_{in}$ 418 at the input terminal of the receiver 404 is relatively large, the parallel connection of the equivalent resistance $R_{101}$ of the impedance matching circuit 400 and the input impedance $Z_{in}$ 418 results in a resistance value approximately equal to equivalent resistance $R_{101}$ of the impedance matching circuit 400. When the resistance of equivalent resistance $R_{101}$ of the impedance matching circuit 400 is determined to be equal to that of the characteristic impedance $Z_{101}$ of the cable 402, impedance matching can be achieved.

When the characteristic impedance $Z_{101}$ of the cable 402 varies, the multiplexer 414 of the impedance matching circuit 400 outputs a reference voltage $V_{ref}$ with a different magnitude to the inverting input terminal of the operational amplifier 412. As the $V_{ref}$ at the inverting input terminal of the operational amplifier 412 is adjusted, the value of $\alpha$ as well as the value of $R_{eq}$ is also adjusted. Accordingly, the value of the equivalent resistance $R_{101}$ is adjusted to match the varied characteristic impedance $Z_{101}$ of the cable 402. Therefore, when the characteristic impedance $Z_{101}$ of the cable 402 varies, the multiplexer 414 selects a suitable reference voltage $V_{ref}$ from the reference voltage generator 416 to change the equivalent resistance $R_{101}$ of the impedance matching circuit 400 such that the equivalent resistance $R_{101}$ is equal to the resistance value of the characteristic impedance $Z_{101}$ of the cable 402. Therefore, impedance matching is achieved.

Embodiment II

Figure 5:
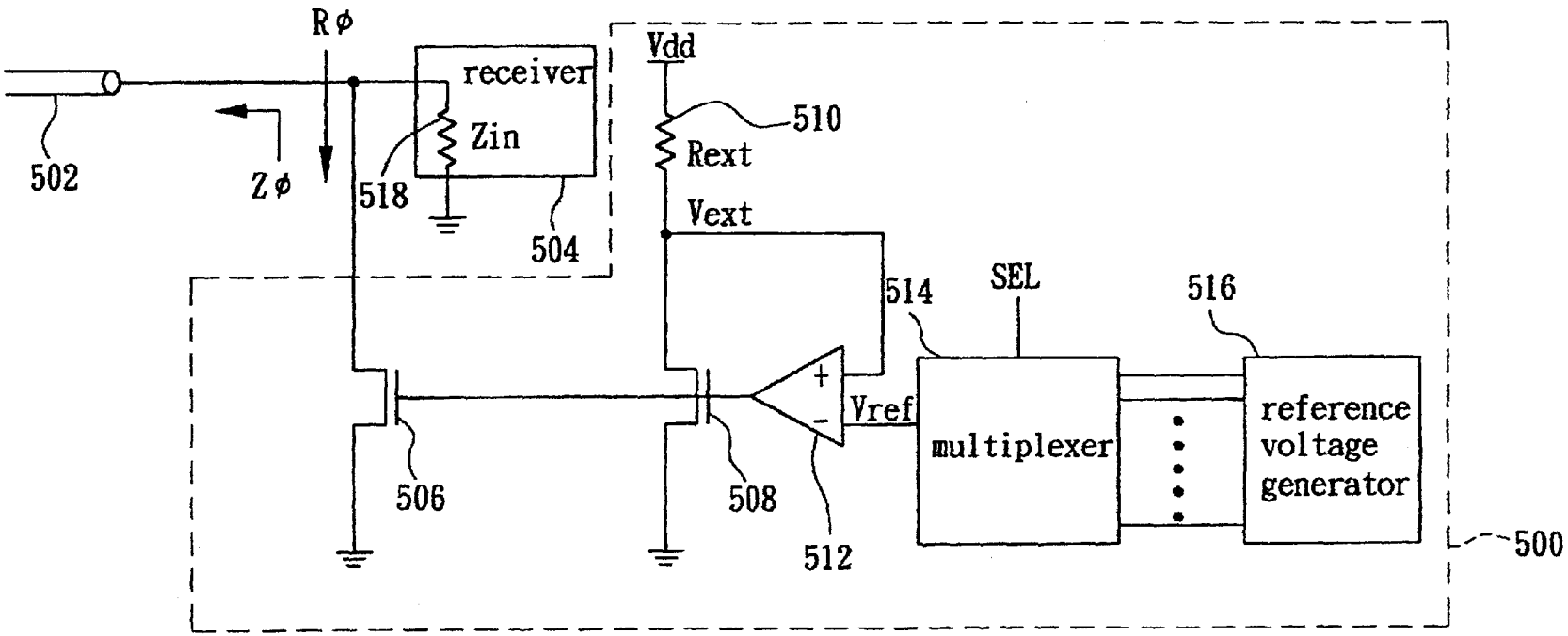
FIG. 5 is a schematic diagram showing an impedance matching circuit in accordance with another embodiment of the present invention.

FIG. 5 is a schematic diagram showing an impedance matching circuit in accordance with another embodiment of the present invention. In FIG. 5, an impedance matching circuit 500 with adjustable resistance is used for facilitating impedance matching between the characteristic impedance of a cable 502 and the input impedance at the input terminal of a receiver 504 for data transmission. The impedance matching circuit 500 is described hereinafter.

The source of the n-channel MOSFET (abbreviated as "NMOS" hereinafter) 506 is connected to the ground and the drain of the NMOS 506 is connected to an input terminal of the receiver 504. The source of the NMOS 508 is connected to the ground and the gate of the NMOS 508 is connected to the gate of the NMOS 506. One terminal of the resistor $R_{ext}$ 510 is connected to the drain of the NMOS 508 and the other terminal of the resistor $R_{ext}$ 510 is connected to the voltage source $V_{dd}$. The inverting input terminal of the operational amplifier 512 receives a reference voltage $V_{ref}$ the non-inverting input terminal of the operational amplifier 512 is connected to the drain of the NMOS 508, and the output terminal of the operational amplifier 512 is connected to the gate of the NMOS 508. The select terminal of the multiplexer 514 receives a select signal SEL, and the signal output terminal outputs the reference voltage $V_{ref}$ to the inverting input terminal of the operational amplifier 512. Moreover, The reference voltage generator 516 includes a plurality of voltage output terminals for outputting the reference voltage $V_{ref}$ to the signal input terminal of the multiplexer 514.

In FIG. 5, the reference voltage at the inverting input terminal of the operational amplifier 512 is expressed as $V_{ref} = \beta \cdot V_{dd}$, where $0 < \beta \leqq 1$. A negative feedback circuit is formed of the NMOS 506, the NMOS 508, and the resistor $R_{ext}$ 510. According to the virtual short circuit theory, we obtain $V_{ref} = \beta \cdot V_{dd} = V_{ext}$, where $V_{ext}$ is the voltage across the drain of the NMOS 508 and the resistor $R_{ext}$ 510. Assuming that the equivalent resistance viewed at the drain of the NMOS 508 is $R_{eq}$. we obtain the voltage $$V_{ext} = \frac{R_{ext}}{R_{ext} + R_{eq}} \cdot V_{dd}.$$

That is, $$\beta = \frac{R_{ext}}{R_{ext} + R_{eq}}$$

and the equivalent resistance $$R_{eq} = \frac{1-\beta}{\beta} \cdot R_{ext}.$$

Let us assume that the aspect ratio of the NMOS 506 is $$\left(\frac{W}{L}\right)_{n1},$$

the aspect ratio of the NMOS 508 is $$\left(\frac{W}{L}\right)_{n2},$$

and the ratio between $$\left(\frac{W}{L}\right)_{n1}$$

and $$\left(\frac{W}{L}\right)_{n2}$$

is y, then $$\left(\frac{W}{L}\right)_{n1} = y \cdot \left(\frac{W}{L}\right)_{n2}.$$

Let us assume that $R_{101}$ denotes the equivalent resistance viewed at the drain of the NMOS 506, where $$R_{\Phi} = \frac{1}{\mu_n \cdot C_{ox} \cdot \left(\frac{W}{L}\right)_{n1} \cdot (V_{gs1} - |V_{tn}|)}$$

$$R_{eq} = \frac{1}{\mu_n \cdot C_{ox} \cdot \left(\frac{W}{L}\right)_{n2} \cdot (V_{gs2} - |V_{tn}|)}$$

$$V_{sg1} = V_{sg2}$$

$$\Rightarrow R_{\Phi} = \frac{1}{y} \cdot R_{eq}$$

$$\Rightarrow R_{\Phi} = \frac{1}{y} \cdot \frac{1-\beta}{\beta} R_{ext}$$

where, $\mu_n$ is the carrier mobility, $C_{ox}$ is the electric capacitance per unit area at the gate, $V_{gs1}$ and $V_{gS2}$ are the voltage drops across the source and the gate, and $|V_{in}|$ is the threshold voltage.

Therefore, when the input impedance $Z_{in}$ 518 at the input terminal of the receiver 504 is relatively large, the parallel connection of the equivalent resistance $R_{101}$ of the impedance matching circuit 500 and the input impedance $Z_{in}$ 518 results in a resistance value approximately equal to equivalent resistance $R_{101}$ of the impedance matching circuit 500. When the resistance of equivalent resistance $R_{101}$ of the impedance matching circuit 500 is determined to be equal to that of the characteristic impedance $Z_{101}$ of the cable 502, impedance matching can be achieved.

When the characteristic impedance $Z_{101}$ of the cable 502 varies, the multiplexer 514 of the impedance matching circuit 500 outputs a reference voltage $V_{ref}$ with a different magnitude to the inverting input terminal of the operational amplifier 512. As the $V_{ref}$ at the inverting input terminal of the operational amplifier 512 is adjusted, the value of β as well as the value of $R_{eq}$ is also adjusted. Accordingly, the value of the equivalent resistance $R_{101}$ is adjusted to match the varied characteristic impedance $Z_{101}$ of the cable 502. Therefore, when the characteristic impedance $Z_{101}$ of the cable 502 varies, the multiplexer 514 selects a suitable reference voltage $V_{ref}$ from the reference voltage generator 516 to change the equivalent resistance $R_{101}$ of the impedance matching circuit 500 such that the equivalent resistance $R_{101}$ is equal to the resistance value of the characteristic impedance $Z_{101}$ of the cable 502. Therefore, impedance matching is achieved.

According to the above discussion, the present invention discloses an impedance matching circuit with adjustable resistance for facilitating impedance matching between the characteristic impedance of a cable and the input impedance at the input terminal of a receiver for data transmission even when the characteristic impedance of the cable varies. Therefore, the present invention has been examined to be progressive, advantageous and applicable to the industry.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. An impedance matching circuit for facilitating impedance matching between the characteristic impedance of a cable and the input impedance at the input terminal of a receiver for data transmission, said impedance matching circuit [comprises] *comprising*:

a first transistor, including a power supply terminal, a control terminal and a load terminal, wherein said power supply terminal of said first transistor is connected to a voltage supply, and said load terminal of said first transistor is connected to an input terminal of said receiver;

a second transistor, including a power supply terminal, a control terminal and a load terminal, wherein said power supply terminal of said second transistor is connected to said voltage supply, and said control terminal of said second transistor is connected to said control terminal of said first transistor;

a resistor, wherein one terminal of said resistor is connected to said load terminal of said second transistor and the other terminal is connected to the ground; and a negative feedback control circuit, wherein an inverting input terminal of said negative feedback control circuit receives an adjustable reference voltage, a non-inverting input terminal of said negative feedback control circuit is connected to said load terminal of said second transistor, and an output terminal of said negative feedback control circuit is connected to said control terminal of said second transistor;

wherein the equivalent resistance of said impedance matching circuit is kept equal to the resistance of the varied characteristic impedance of said cable by adjusting said reference voltage.

2. The impedance matching circuit as recited in claim 1, wherein said first transistor is a p-channel MOSFET.

3. The impedance matching circuit as recited in claim 1, wherein said second transistor is a p-channel MOSFET.

4. The impedance matching circuit as recited in claim 1, further comprising: a multiplexer, including a select terminal and a signal output terminal; wherein said multiplexer receives a plurality of voltage signals having different magnitudes, selects one from said plurality of voltage signals according to a select signal received by said select terminal, and then outputs said voltage signal as said reference voltage into said inverting input terminal of said negative feedback control circuit.

5. The impedance matching circuit as recited in claim 4, further comprising: a reference voltage generator for generating said voltage signals to be output to said multiplexer.

6. The impedance matching circuit as recited in claim 4, wherein said negative feedback control circuit is implemented by using one of an operational amplifier, a differential amplifier, and an inverter amplifier.

7. An impedance matching circuit for facilitating impedance matching between the characteristic impedance of a cable and the input impedance at the input terminal of a receiver for data transmission, said impedance matching circuit [comprises] *comprising*:

a first transistor, including a power supply terminal, a control terminal and a load terminal, wherein said power supply terminal of said first transistor is connected to an input terminal of said receiver, and said load terminal of said first transistor is connected to the ground;

a resistor, wherein one terminal of said resistor is connected to a voltage source;

a second transistor, including a power supply terminal, a control terminal and a load terminal, wherein said power supply terminal of said second transistor is connected to the other terminal of said resistor, and said control terminal of said second transistor is connected to said control terminal of said first transistor; and a negative feedback control circuit, wherein an inverting input terminal of said negative feedback control circuit receives an adjustable reference voltage, a non-inverting input terminal of said negative feedback control circuit is connected to said power supply terminal of said second transistor, and an output terminal of said negative feedback control circuit is connected to said control terminal of said second transistor;

wherein the equivalent resistance of said impedance matching circuit is kept equal to the resistance of the varied characteristic impedance of said cable by adjusting said reference voltage.

8. The impedance matching circuit as recited in claim 7, wherein said first transistor is an n-channel MOSFET.

9. The impedance matching circuit as recited in claim 7, wherein said second transistor is an n-channel MOSFET.

10. The impedance matching circuit as recited in claim 7, further comprising: a multiplexer, including a select terminal and a signal output terminal; wherein said multiplexer receives a plurality of voltage signals having different magnitudes, selects one from said plurality of voltage signals according to a select signal received by said select terminal, and then outputs said voltage signal as said reference voltage into said inverting input terminal of said negative feedback control circuit.

11. The impedance matching circuit as recited in claim 10, further comprising: a reference voltage generator for generating said voltage signals to be output to said multiplexer.

12. The impedance matching circuit as recited in claim 7, wherein said negative feedback control circuit is implemented by using one of an operational amplifier, a differential amplifier, and an inverter amplifier.

*13. An apparatus for impedance matching at the input terminal of a receiver, comprising:*

*a first controlled impedance unit utilized to provide an equivalent resistance of the input terminal according to a first control signal;*

*a resistor; and*

*an impedance control circuit, coupled to the first controlled impedance unit and to the resistor, utilized to receive an reference signal and generate the first control signal according to the reference signal and a resistance of the resistor;*

*wherein the reference signal is adjusted such that the equivalent resistance of the input terminal is adjusted.*

*14. The apparatus of claim 13, wherein the impedance control circuit comprises:*

*a second controlled impedance unit, coupled to the resistor, utilized for providing an equivalent resistance of the input terminal according to the first control signal;*

*wherein the first controlled impedance unit is corresponding to the second controlled impedance unit.*

*15. The apparatus of claim 14, wherein the impedance control circuit further comprises a feedback control unit which includes an inverting input terminal, a non-inverting input terminal, and an output terminal, wherein the inverting input terminal receives the reference signal, and the non-inverting input terminal is coupled to the resistor.*

*16. The apparatus of claim 14, wherein the impedance control circuit further comprises a feedback control unit which is implemented by using one of an operational amplifier, a differential amplifier, and an inverter amplifier.*

*17. The apparatus of claim 14, wherein the first controlled impedance unit is a first transistor.*

*18. The apparatus of claim 17, wherein the second controlled impedance unit is a second transistor.*

*19. The apparatus of claim 13, wherein the impedance control circuit comprises a second controlled impedance unit, and the first controlled impedance unit is corresponding to the second controlled impedance unit.*

*20. The apparatus of claim 21, wherein the reference signal is adjusted such that the equivalent resistance of the input terminal is adjusted.*

*21. An apparatus for impedance matching at the input terminal of a receiver, comprising:*

*a first controlled impedance unit utilized to provide an equivalent resistance of the input terminal according to a first control signal;*

*a resistor;*

*an impedance control circuit, coupled to the first controlled impedance unit and to the resistor, utilized to receive an reference signal and generate the first control signal according to the reference signal and a resistance of the resistor; and*

*a multiplexer, coupled to the impedance control circuit, utilized to receive a digital control signal and a plurality of reference signals, and output the reference signal according to the digital control signal.*

*22. A method for impedance matching in a receiver, comprising:*

*providing a controlled impedance unit;*

*generating a reference signal according to a digital control signal;*

*generating a control signal according to the reference signal and a resistance of a resistor;*

*providing an equivalent resistance of the controlled impedance unit according to the control signal; and*

*adjusting the equivalent resistance of the controlled impedance unit when the reference signal is adjusted.*

*23. A method for impedance matching in a receiver, comprising:*

*providing a controlled impedance unit;*

*generating a reference signal according to a digital control signal;*

*generating a control signal according to the reference signal and a resistance of a resistor; and*

*providing an equivalent resistance of the controlled impedance unit according to the control signal;*

*wherein the step of generating the reference signal comprises:*

*selecting one of a plurality of reference signals according to the digital control signal to generate the reference signal.*

*24. The method of claim 23, wherein the reference signal is adjusted such that the equivalent resistance of the controlled impedance unit is adjusted.*

*25. An apparatus for impedance matching at the input terminal of a receiver, comprising:*

*a first controlled impedance unit utilized to provide an equivalent resistance of the input terminal according to a first control signal; and*

*an impedance control circuit, coupled to the first controlled impedance unit, utilized to couple to a resistor, receive an reference signal and generate the first control signal according to the reference signal and a resistance of the resistor;*

*wherein the reference signal is adjusted such that the equivalent resistance of the input terminal is adjusted.*

*26. The apparatus of claim 26, further comprising:*

*a multiplexer, coupled to the impedance control circuit, utilized to receive a digital control signal and a plurality of reference signals, and output the reference signal according to the digital control signal.*

* * * * *